(12) United States Patent
Sekizuka

(10) Patent No.: US 9,174,819 B2
(45) Date of Patent: Nov. 3, 2015

(54) SHEET STACKING APPARATUS, CONTROL METHOD OF SHEET STACKING APPARATUS, AND STORAGE MEDIUM

(71) Applicant: CANON KABUSHIKI KAISHA, Tokyo (JP)

(72) Inventor: Masayuki Sekizuka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/566,557

(22) Filed: Dec. 10, 2014

(65) Prior Publication Data

US 2015/0166292 A1    Jun. 18, 2015

(30) Foreign Application Priority Data

Dec. 13, 2013  (JP) ................................. 2013-258138

(51) Int. Cl.

| B65H 31/10 | (2006.01) |
| B65H 31/00 | (2006.01) |
| B65H 43/06 | (2006.01) |
| H04N 1/00 | (2006.01) |

(52) U.S. Cl.
CPC ............... *B65H 31/10* (2013.01); *B65H 31/00* (2013.01); *B65H 43/06* (2013.01); *H04N 1/0048* (2013.01); *H04N 1/00631* (2013.01); *H04N 2201/0094* (2013.01)

(58) Field of Classification Search
CPC .............. B65H 1/14; B65H 1/18; B65H 7/02; B65H 7/20; B65H 31/10; B65H 43/04; B65H 43/08; B65H 2511/521; H04N 1/0048; H04N 1/00631

See application file for complete search history.

(56) References Cited

U.S. PATENT DOCUMENTS

| 7,140,610 | B2 * | 11/2006 | Kako et al. ............... 271/258.01 |
| 8,262,086 | B2 * | 9/2012 | Kitazawa ...................... 271/215 |
| 2007/0273083 | A1 * | 11/2007 | Imai .............................. 271/152 |
| 2015/0145201 | A1 * | 5/2015 | Miyajima ..................... 271/215 |
| 2015/0147153 | A1 * | 5/2015 | Ishizuka ....................... 414/802 |
| 2015/0151945 | A1 * | 6/2015 | Kuroda ....................... 414/788.1 |

FOREIGN PATENT DOCUMENTS

JP         2001-226022 A      8/2001

* cited by examiner

*Primary Examiner* — Jeremy R Severson

(74) *Attorney, Agent, or Firm* — Canon USA, Inc., IP Division

(57) ABSTRACT

A sheet stacking apparatus includes a lowering control unit to lower a sheet stacking portion, a determination unit, an acquisition unit, an identification unit, and a notification unit. The determination unit determines that the sheet stacking portion cannot be lowered by the lowering control unit. The acquisition unit acquires a position of the sheet stacking portion at which the determination unit determines that the sheet stacking portion cannot be lowered. The identification unit identifies an amount of sheets stackable on the sheet stacking portion without removing an obstacle placed under the sheet stacking portion based on the position acquired by the acquisition unit. The notification unit notifies the amount of sheets identified by the identification unit and an amount of sheets stackable on the sheet stacking portion after removal of the obstacle placed under the sheet stacking portion.

14 Claims, 15 Drawing Sheets

FIG.2

100 MFP

FIG.9

■ FULL-LOADED ERROR

PLEASE REMOVE SHEETS FROM STACKING TRAY.

YOU CAN CONTINUE PRINTING BY REMOVING SHEETS.
PLEASE PRESS STOP KEY IF YOU STOP PRINTING.

STOP

■ SERVICE ERROR

SERVICE OPERATION IS NECESSARY.
PLEASE CALL SERVICE ENGINEER.

CONTACT INFORMATION: 0XX-XXX-XXXX

FIG.11

■ OBSTACLE DETECTION ERROR

OBSTACLE IS DETECTED.
SHEETS CANNOT BE STACKED ANY MORE.

YOU CAN CONTINUE PRINTING BY REMOVING
STACKED SHEETS OR OBSTACLE.

PLEASE PRESS OK KEY AFTER REMOVING OBSTACLE.
PLEASE PRESS STOP KEY IF YOU STOP PRINTING.

| STOP | OK |

■ OBSTACLE DETECTION ERROR

OBSTACLE IS DETECTED.
SHEETS CANNOT BE STACKED.

YOU CAN CONTINUE PRINTING BY REMOVING OBSTACLE.

PLEASE PRESS OK KEY AFTER REMOVING OBSTACLE.
PLEASE PRESS STOP KEY IF YOU STOP PRINTING.

STOP       OK

■ DETECTION RESULT OF NUMBER OF STACKABLE SHEETS

OBSTACLE IS DETECTED.

[NUMBER OF STACKABLE SHEETS]

NUMBER OF SHEETS STACKABLE AFTER REMOVING OBSTACLE: 3000 SHEETS

NUMBER OF SHEETS STACKABLE WITHOUT REMOVING OBSTACLE: 1800 SHEETS

CLOSE

■ DETECTION RESULT OF NUMBER OF STACKABLE SHEETS

OBSTACLE IS NOT DETECTED.

3000 SHEETS CAN BE STACKED.

CLOSE

*1501*

SHEET STACKING APPARATUS, CONTROL METHOD OF SHEET STACKING APPARATUS, AND STORAGE MEDIUM

BACKGROUND OF THE INVENTION

1. Field of the Invention

The present invention relates to a sheet stacking apparatus capable of stacking sheets on a sheet stacking portion, a control method of the sheet stacking apparatus, and a storage medium.

2. Description of the Related Art

Conventionally, there has been provided a sheet stacking apparatus for discharging sheets to a sheet stacking portion that can be lifted and lowered.

The above sheet stacking apparatus discharges the sheets on which images are printed to a sheet stacking portion from a sheet discharge port after the images are printed on the sheets. The sheet stacking portion is lowered every time the sheet is discharged to the sheet stacking portion in such a manner that an uppermost surface of the sheets stacked on the sheet stacking portion is positioned in a vicinity of the sheet discharge port, and thus the sheets discharged from the sheet discharge port can be stably stacked thereon.

In a case where an obstacle which interrupts the lowering of the sheet stacking portion is placed under the sheet stacking portion, the sheet stacking portion may collide with the obstacle in the course of lowering the sheet stacking portion. If the sheet stacking portion is forced to lower after colliding with the obstacle, a load is applied to a driving unit for lowering the sheet stacking portion, and thus the sheet stacking portion or the driving unit may be damaged.

Japanese Patent Application Laid-Open No. 2001-226022 discusses a technique for displaying a warning message for prompting a user to remove an obstacle while stopping sheet discharge and lowering of the sheet stacking portion when lowering of the sheet stacking portion is interrupted by the obstacle.

In the above conventional technique, stacking sheets without removing the obstacle is not taken into consideration.

A space under the sheet stacking portion is easily accessible by the user because the space is close to the apparatus. Therefore, for example, the user may place bundles of sheets under the sheet stacking portion so that the user can promptly supply a bundle of sheets when there is a shortage of sheets in the apparatus. Further, the user may place a recording agent such as toner or ink under the sheet stacking portion so that the user can promptly supply the recording agent when there is a shortage of the recording agent in the apparatus. Furthermore, the user may place an instruction manual under the sheet stacking portion so that the user can promptly refer to an operation method of the apparatus.

There may be a case where the user would like to stack sheets while intentionally placing these items under the sheet stacking portion.

The user can complete sheet stacking without removing the obstacle in a case where the user stacks a small number of sheets.

On the other hand, if the user stacks a large number of sheets, it is better for the user to stack sheets after removing the obstacle. This is because by removing the obstacle, the user can reduce a possibility of suspending the sheet stacking operation.

However, with the conventional technique, it is difficult for the user to easily determine how many sheets can be stacked after removing or without removing the obstacle.

Therefore, it is difficult for the user to easily determine whether the user should stack sheets after removing or without removing the obstacle.

SUMMARY OF THE INVENTION

According to an aspect of the present invention, a sheet stacking apparatus includes a lowering control unit configured to lower a sheet stacking portion, a determination unit configured to determine that the sheet stacking portion cannot be lowered by the lowering control unit, an acquisition unit configured to acquire a position of the sheet stacking portion at which the determination unit determines that the sheet stacking portion cannot be lowered, an identification unit configured to identify an amount of sheets stackable on the sheet stacking portion without removing an obstacle placed under the sheet stacking portion based on the position acquired by the acquisition unit, and a notification unit configured to notify the amount of sheets identified by the identification unit and an amount of sheets stackable on the sheet stacking portion after removal of the obstacle placed under the sheet stacking portion.

A sheet stacking apparatus provides a system permitting a user to easily recognize an amount of sheets stackable after removing an obstacle and an amount of sheets stackable without removing the obstacle. Further features of the present invention will become apparent from the following description of exemplary embodiments with reference to the attached drawings.

BRIEF DESCRIPTION OF THE DRAWINGS

FIG. 2 is a cross-sectional diagram illustrating a configuration of the image processing apparatus according to the present exemplary embodiment.

FIG. 9 is a diagram illustrating a screen according to the present exemplary embodiment.

FIG. 10 is a diagram illustrating a screen according to the present exemplary embodiment.

FIG. 11 is a diagram illustrating a screen according to the present exemplary embodiment.

FIG. 12 is a diagram illustrating a screen according to the present exemplary embodiment.

FIG. 14 is a diagram illustrating a screen according to the present exemplary embodiment.

FIG. 15 is a diagram illustrating a screen according to the present exemplary embodiment.

DESCRIPTION OF THE EMBODIMENTS

Various exemplary embodiments, features, and aspects of the invention will be described in detail below with reference to the drawings.

Hereinafter, an exemplary embodiment according to the present invention will be described with reference to the appended drawings.

Figure 1:
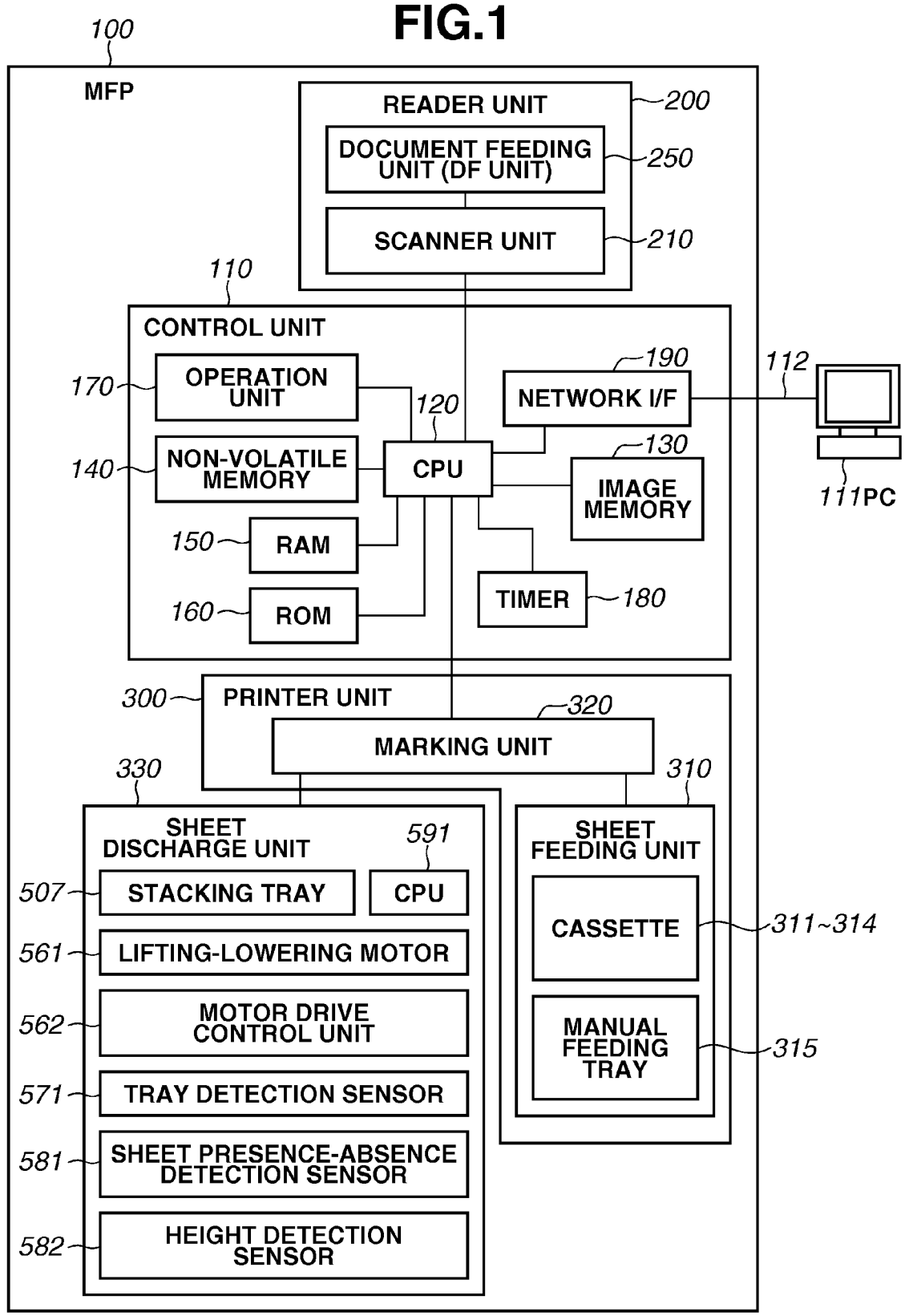
FIG. 1 is a block diagram illustrating a configuration of an image processing apparatus according to a present exemplary embodiment.

FIG. 1 is a block diagram illustrating a printing system according to a first exemplary embodiment. The printing system according to the present exemplary embodiment is configured of a personal computer (PC) 111 and a multifunction peripheral (MFP) 100.

The MFP 100 according to the present exemplary embodiment includes a control unit 110, a reader unit 200, and a printer unit 300. Although the present exemplary embodiment will be described by taking the MFP as an image processing apparatus, a single functional peripheral (SFP) may be also employed as the apparatus as long as the apparatus includes a printing function executed by the printer unit 300. The reader unit 200, the control unit 110, and the printer unit 300 are electrically connected to each other, so as to mutually transmit/receive a control command and data. A sheet discharge unit 330 is detachably disposed on the MFP 100.

The control unit 110 includes a central processing unit (CPU) 120, an image memory 130, a non-volatile memory 140, a random access memory (RAM) 150, a read only memory (ROM) 160, an operation unit 170, and a timer 180.

The CPU 120 executes a program stored in the ROM 160 by loading the program onto the RAM 150, so as to integrally control the MFP 100.

The RAM 150 functions as a work region of the CPU 120, and stores various programs and data.

The ROM 160 stores various programs loaded and executed by the CPU 120.

The image memory 130 is a memory for storing image data. For example, the image memory 130 stores image data read by the reader unit 200 and image data received from the PC 111. The image data stored in the image memory 130 is transmitted to the printer unit 300 according to an instruction of the CPU 120.

The non-volatile memory 140 functions as a unit for storing data even if power is not supplied thereto. The non-volatile memory 140 stores various programs and image data. Any storage medium such as a hard disk drive (HDD), a digital versatile disk (DVD), or a Blu-ray disk (BD) may be employed as the non-volatile memory 140 as long as the storage medium has a capacity sufficient for storing the image data. Further, a solid state drive (SSD) may be also employed as the non-volatile memory 140.

The operation unit 170 includes a display portion and hard keys, so as to display an operation screen to receive an operation of the user.

The timer 180 is used for measuring time.

A network interface (I/F) 190 executes control for enabling the MFP 100 to communicate with an external device such as the PC 111 via a network 112. Herein, the PC 111 will be described as an example of the external device. However, the external device may be another MFP, a mobile terminal, or a facsimile apparatus. Further, in the present exemplary embodiment, a configuration will be described in which the MFP 100 and the external device are connected to each other via the wired network 112. However, the MFP 100 and the external device may be connected to each other via a universal serial bus (USB) cable. Further, the MFP 100 and the external device may be configured to be able to communicate with each other through wireless communication such as the Wireless Fidelity (Wi-Fi).

The reader unit 200 includes a scanner unit 210 and a document feeding (DF) unit 250. The scanner unit 210 reads an image of a document to generate image data of the read image, whereas the document feeding unit 250 conveys a document to be read by the scanner unit 210.

The printer unit 300 is a unit for printing an image on a sheet (recording paper). The printer unit 300 conveys and feeds the sheets stored in a sheet feeding unit 310 to a marking unit 320 one-by-one. The sheet feeding unit 310 includes cassettes 311 to 314 and a manual feeding tray 315.

The marking unit 320 prints an image on a sheet fed thereto based on the image data transmitted from the image memory 130. In addition, the marking unit 320 may be either an electro-photographic type or an ink-jet type. Further, another type of marking unit may be employed therefore as long as the image can be printed.

Then, the printer unit 300 conveys the sheet on which the image is printed to the sheet discharge unit 330. The sheet discharge unit 330 includes a stacking tray 507, so that the conveyed sheets are discharged to the stacking tray 507. The stacking tray 507 is an example of a sheet stacking portion, and also referred to as a sheet discharge tray. A CPU 591 controls the sheet discharge unit 330 according to an instruction from the CPU 120. A lifting-lowering motor 561 lifts or lowers the stacking tray 507. A motor drive control unit 562 drives the lifting-lowering motor 561. The stacking tray 507 is lifted when the lifting-lowering motor 561 is rotated in a forward direction whereas the stacking tray 507 is lowered when the lifting-lowering motor 561 is rotated in a backward direction. The motor drive control unit 562 operates according to an instruction from the CPU 120. A tray detection sensor 571 detects a position (height) of the stacking tray 507. A sheet presence-absence detection sensor 581 detects presence or absence of the sheets stacked on the stacking tray 507. A height detection sensor 582 detects a height of the sheets stacked on the stacking tray 507.

Although the sheet discharge unit 330 includes the CPU 591 in FIG. 1, the sheet discharge unit 330 does not have to include the CPU 591. Instead, the CPU 120 may directly control the sheet discharge unit 330.

Figure 2:
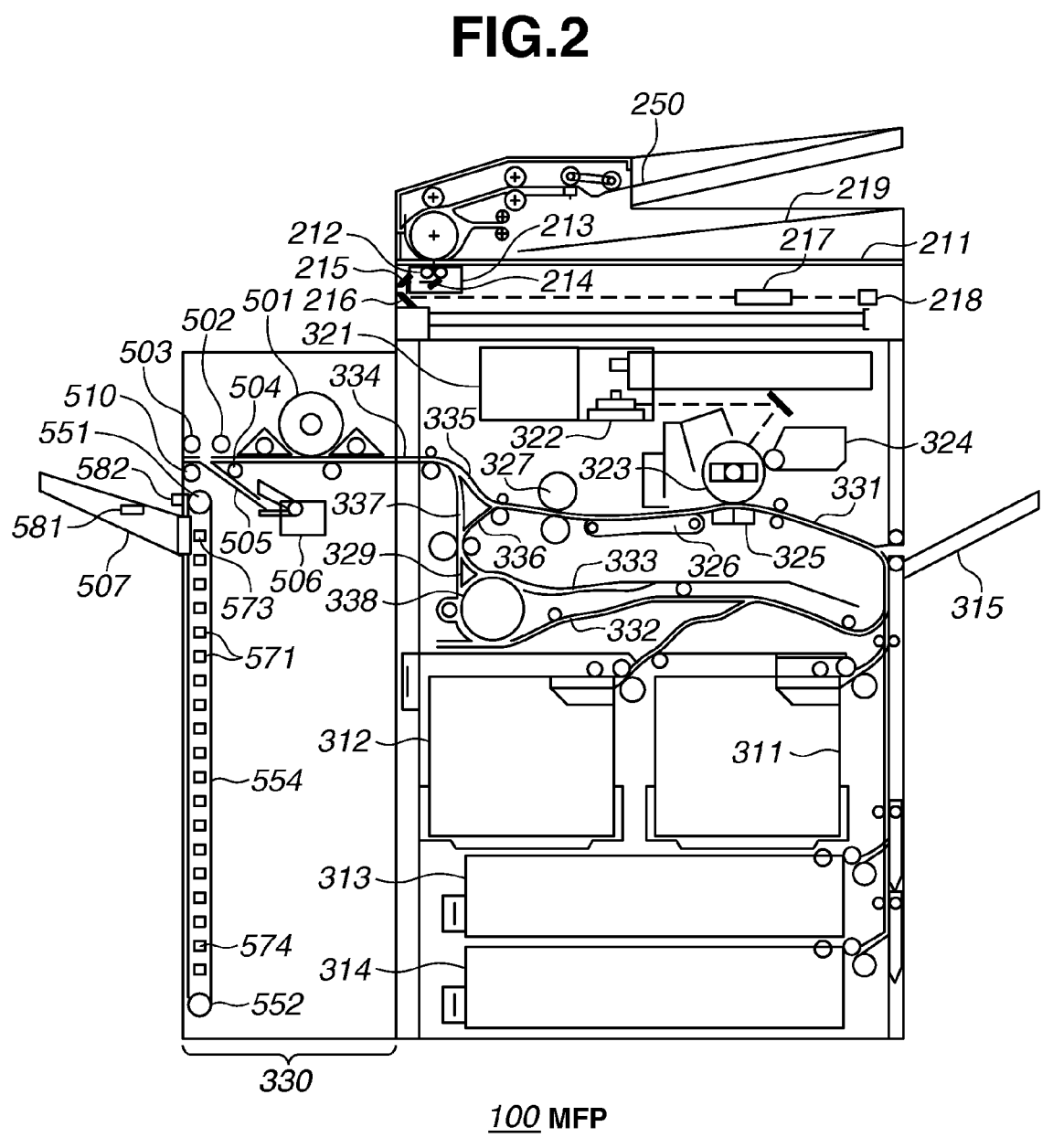

Next, the MFP 100 illustrated in FIG. 1 will be described in detail with reference to FIG. 2.

The document feeding unit 250 of the reader unit 200 feeds and conveys the documents placed on a document stand to an optical unit 213 one-by-one. The documents conveyed to the optical unit 213 are discharged to a sheet discharge tray 219.

When the document is conveyed onto the optical unit 213, the reader unit 200 turns on a lamp 212, so that the optical unit 213 irradiates the document with light. At this time, the light reflected from the document is introduced to a charge coupled device image sensor (hereinafter, simply referred to as "CCD") 218 through mirrors 214, 215, 216, and a lens 217. Then, the image on the document is read by the CCD 218. The image data output from the CCD 218 is transferred to the control unit 110 after a predetermined processing is executed thereon.

Further, the reader unit 200 reads an image of the document placed between the document feeding unit 250 and a platen glass 211. In this case, the reader unit 200 turns on the lamp 212 and moves the optical unit 213. At this time, the light reflected from the document is introduced to the CCD 218 through the mirrors 214, 215, 216, and the lens 217. Then, the image on the document is read by the CCD 218. The image data output from the CCD 218 is transferred to the control unit 110 after predetermined processing is executed thereon. In the present exemplary embodiment, the image of the document is read by the CCD 218 as an example. However, the image of the document may be read by using a contact image sensor (CIS). When the image of the document is read by the CIS, the CIS is disposed at a position of the optical unit 213 whereas the mirrors 214, 215, 216, and the lens 217 are not necessary.

A laser driver 321 disposed on the printer unit 300 drives a laser light emitting unit 322 so that the laser light emitting unit 322 emits laser light according to the image data output from the image memory 130 of the control unit 110. A photosensitive drum 323 is irradiated with the laser light, so that a latent image according to the laser light is formed on the photosensitive drum 323. A development unit 324 applies developer on the latent image formed on the photosensitive drum 323.

Further, the printer unit 300 includes the drawer-shaped cassettes 311 to 314 and the manual feeding tray 315 serving as the sheet feeding unit 310. The printer unit 300 conveys a sheet to a transfer unit 325 through a conveyance path 331 by feeding the sheet from any one of the cassettes 311 to 314 and the manual feeding tray 315. The transfer unit 325 transfers the developer applied on the photosensitive drum 323 to the sheet.

The sheet on which the developer is transferred is conveyed to a fixing unit 327 by a conveyance belt 326. The fixing unit 327 applies heat and pressure to the sheet to fix the developer thereon. Thereafter, the sheet having passed through the fixing unit 327 is discharged through conveyance paths 335 and 334. In order to discharge the sheet by inverting a printed surface thereof, the sheet is conveyed up to a conveyance path 338 through a conveyance path 336. From that point, the sheet is conveyed in a reverse direction, so as to be conveyed through conveyance paths 337 and 334.

Further, in a case where the user specifies two-sided printing, the sheet is guided to a conveyance path 333 by a flapper 329 via the conveyance path 336 after passing through a fixing unit 327. Thereafter, the sheet is conveyed in a reverse direction, so as to be guided to a sheet re-feeding conveyance path 332 by the flapper 329 via the conveyance path 338. The sheet guided to the sheet re-feeding conveyance path 332 is conveyed to the transfer unit 325 by passing through the conveyance path 331 at the above-described timing. At this time, the transfer unit 325 applies developer on a second plane of the sheet, which is the other side of a first plane on which the image has already been transferred by the transfer unit 325. Then, the sheet is guided to the conveyance path 334 via the fixing unit 327.

The sheet conveyed through the conveyance path 334 is conveyed to the sheet discharge unit 330 regardless of whether printing is executed on one side or two sides thereof.

The sheet conveyed to the sheet discharge unit 330 is first conveyed to a buffer unit 501. The buffer unit 501 winds the conveyed sheet around a buffer roller to buffer the sheet as appropriate. For example, in a case where time-consuming processing such as stapling is executed at the downstream thereof, the interval of sheets to be conveyed from the main unit of the MFP 100 can be adjusted by employing the buffer unit 501.

Thereafter, the sheet is conveyed through an upstream sheet discharge roller pair 502 and a downstream sheet discharge roller pair 503, so as to be stacked on a stacking tray 505 via a conveyance path 504. When one copy worth of sheet bundle is stacked on the stacking tray 505, the stacked sheet bundle is discharged to the stacking tray 507.

In a case where the sheet bundle is set to be shifted, the sheet bundle stacked on the stacking tray 505 is discharged to the stacking tray 507 by shifting it 1 cm relative to a previously discharged sheet bundle, so that the user can easily recognize a division between the copies. In addition, a shift width of the sheet bundle can be other than 1 cm.

In a case where the sheet bundle is set to be stapled, a staple unit 506 executes stapling on the sheet bundle stacked on the stacking tray 505 that has been conveyed through the upstream sheet discharge roller pair 502 and the downstream sheet discharge roller pair 503 via the conveyance path 504. The stapled sheet bundle is discharged to the stacking tray 507 by the downstream discharge roller pair 503.

The stacking tray 507 is fixed to a belt 554. The belt 554 is stretched by an upper pulley 551 and a lower pulley 552. A concavo-convex portion is provided on the belt 554, and the belt 554 is stretched to engage with concavo-convex portions provided on the upper pulley 551 and the lower pulley 552. Therefore, the belt 554 moves according to the movement of the upper pulley 551. The upper pulley 551 is rotated in a clockwise direction or a counterclockwise direction in FIG. 2 by the driving force of the lifting-lowering motor 561 illustrated in FIG. 1. Specifically, the upper pulley 551 rotates in the clockwise direction in FIG. 2 when the lifting-lowering motor 561 rotates in the forward direction, so that the stacking tray 507 is lifted by the belt 554 that moves in cooperation with the upper pulley 551. On the other hand, the upper pulley 551 rotates in the counterclockwise direction in FIG. 2 when the lifting-lowering motor 561 rotates in the backward direction, so that the stacking tray 507 is lowered by the belt 554 that moves in cooperation with the upper pulley 551. The lower pulley 552 rotates according to the movement of the belt 554 without receiving the driving force from the lifting-lowering motor 561. In addition, the lower pulley 552 may also rotate by receiving the driving force from the lifting-lowering motor 561.

Further, the height detection sensor 582 measures a distance to the upper surface of the stacking tray 507 or a distance to the upper surface of the sheets stacked thereon. Specifically, when the sheets are not stacked on the stacking tray 507, the upper surface of the stacking tray 507 is irradiated with infrared light, so that the height detection sensor 582 measures the distance to the upper surface of the stacking tray 507 by detecting and measuring the amount of infrared light reflected therefrom. On the other hand, when the sheets are stacked on the stacking tray 507, the sheets stacked on the stacking tray 507 are irradiated with infrared light, so that the height detection sensor 582 measures the distance to the upper surface of the sheets by detecting and measuring the amount of infrared light reflected therefrom. Then, the CPU 120 controls the lifting-lowering motor 561 to lift or lower the stacking tray 507 such that the distance to the upper surface of the stacking tray 507 or the distance to the upper surface of the sheets is constant. In other words, the stacking tray 507 is lifted or lowered according to the amount of sheets stacked on the stacking tray 507. The stacking tray 507 is lowered when the sheets are to be discharged, and the stacking tray 507 is lifted when the sheets stacked on the stacking tray 507 are removed.

The sheet presence-absence detection sensor 581 detects presence or absence of the sheets stacked on the stacking tray 507. The sheet presence-absence detection sensor 581 detects the presence of sheets on the stacking tray 507 by detecting that a switch projected on the stacking tray 507 is pressed down with the weight of the sheets. In addition, this switch can be sufficiently pressed down with the weight of a single sheet. The sheet presence-absence detection sensor 581 transmits a signal indicating the presence of the sheets to the CPU 120 when the sheets exist in the stacking tray 507, and transmits a signal indicating the absence of the sheets to the CPU 120 when the sheets do not exist therein. The CPU 120 determines presence or absence of the sheets on the stacking tray 507 by receiving the signal from the sheet presence-absence detection sensor 581.

Further, a plurality of tray detection sensors 571 is disposed in order to detect the position of the stacking tray 507, so that the CPU 120 detects the position of the stacking tray 507 depending on a tray detection sensor 571 which detects the stacking tray 507. In the present exemplary embodiment, 20 pieces of tray detection sensors 571 are disposed in the vertical direction at regular intervals in FIG. 2. The CPU 120 distinguishes and detects the respective signals from 20 pieces of the tray detection sensors 571. When the CPU 120 receives a signal from the tray detection sensor 571, the CPU 120 recognizes that the signal has been transmitted from the tray detection sensor 571 disposed on the n-th position ("n" represents an integer from 1 to 20) from the top. In the present exemplary embodiment, the configuration having 20 pieces of tray detection sensors 571 are described. However, the number of tray detection sensors 571 may be other than 20 pieces.

An upper end sensor 573 at the uppermost position, serving as one of the tray detection sensors 571, is disposed on the uppermost position to which the stacking tray 507 can be lifted, so that the upper end sensor 573 detects the stacking tray 507 existing in the highest position (the uppermost lifting position). On the other hand, a lower end sensor 574 at the lowermost position, serving as one of the tray detection sensors 571, is disposed on the lowermost position (the lowermost lowering position) to which the stacking tray 507 can be lowered, so that the lower end sensor 574 detects the stacking tray 507 existing in the lowermost position.

Here, the maximum number (i.e., upper limit number) of sheets stackable on the stacking tray 507 of the MFP 100 according to the present exemplary embodiment is 3000 sheets. In other words, if the sheets are stacked on the empty stacking tray 507, 3000 sheets (3000 normal papers) can be stacked thereon until the stacking tray 507 is fully loaded. Further, "3000 sheets" are merely an example of the maximum number of stackable sheets, and thus the maximum number thereof may be other than 3000 sheets. The value of 3000 representing the maximum number of stackable sheets is stored in the ROM 160, so that the CPU 120 can refer thereto.

Figure 3:
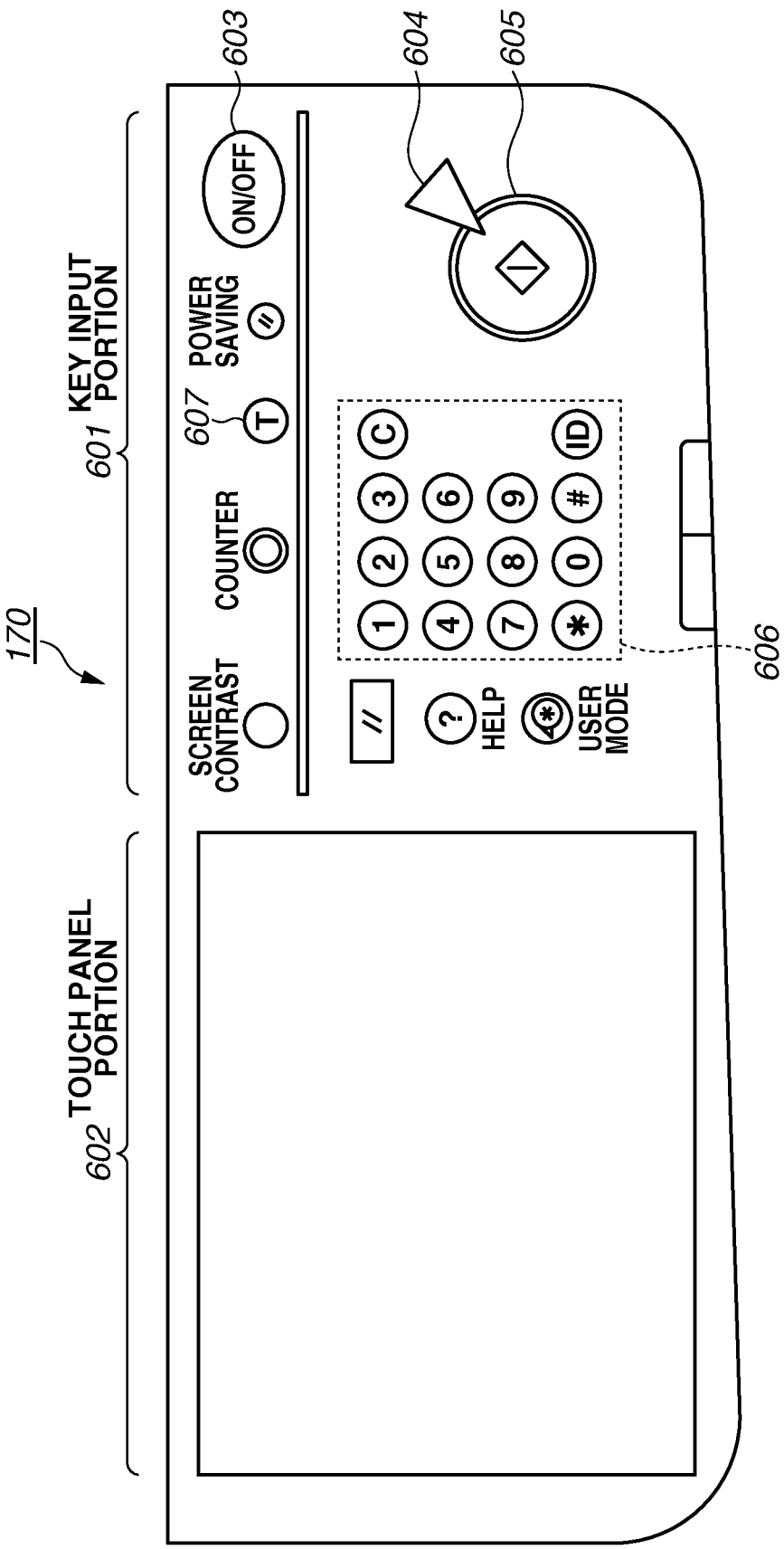
FIG. 3 is a diagram illustrating an operation unit according to the present exemplary embodiment.

Next, the operation unit 170 included in the MFP 100 illustrated in FIG. 1 will be described with reference to FIG. 3.

The operation unit 170 includes a key input portion 601 and a touch panel portion 602. The key input portion 601 receives an operation of the user input through hard keys, whereas the touch panel portion 602 can display soft keys (display key) to receive an operation of the user input through the soft keys.

First, the key input portion 601 will be described. The key input portion includes an operation unit power switch 603. When the user presses the operation unit power switch 603 while the MFP 100 is in a stand-by mode (normal power state), the CPU 120 switches the MFP 100 to a sleep mode (i.e., a state where power consumption thereof is smaller than in the normal power state) from the stand-by mode. On the other hand, when the user presses the operation unit power switch 603 while the MFP 100 is in the sleep mode, the CPU 120 switches the MFP 100 to the stand-by mode from the sleep mode.

A start key 605 receives an instruction for causing the MFP 100 to execute copying or data transmission from the user.

A stop key 604 receives an instruction for stopping the copying or making a data transmission, from the user.

A numerical keypad 606 allows the user to input a setting value of various settings.

A test key 607 enables the input of an instruction for detecting the number of stackable sheets to be described below.

Subsequently, the touch panel portion 602 will be described. The touch panel portion 602 includes a liquid crystal display (LCD) and a touch panel sheet configured of a transparent electrode attached thereon. The touch panel portion 602 includes a function for receiving various settings from the user by displaying an operation screen, and a function for notifying the user of a state of the MFP 100 and an error message. In the present exemplary embodiment, the operation unit 170 includes both the touch panel portion 602 and the key input portion 601. However, the present invention is not limited thereto. For example, the operation unit 170 may be simply configured of the touch panel portion 602 without having the key input portion 601, so that the touch panel portion 602 displays keys having the function equivalent to that of the keys included in the key input portion 601 if necessary.

The MFP 100 configured as the above can execute various jobs.

For example, the MFP 100 reads a document image using the reader unit 200, generates image data corresponding to the read document image, so as to execute a copy job to print an image on a sheet based on the image data and settings received from the operation unit 170.

Further, the MFP 100 analyzes print data received from the PC 111, generates image data based on print settings received from the PC 111, so as to execute a print job to print an image on a sheet based on the generated image data.

Furthermore, the MFP 100 receives code data from an external facsimile apparatus via a phone line, converts the received code data into image data, so as to execute a facsimile print job to print an image on a sheet based on the converted image data.

The MFP 100 receives a plurality of the above-described jobs and sequentially stores in the non-volatile memory 140, so as to execute the jobs in the order of storing the jobs in the non-volatile memory 140.

In the present exemplary embodiment, the MFP 100 executes a plurality of jobs. However, the present invention is not limited thereto. The MFP 100 may execute a part of the jobs from among the above-described plurality of jobs.

Then, when sheets are stacked, the CPU 120 of the MFP 100 drives the lifting-lowering motor 561 to lower the stacking tray 507 by detecting the upper surface of the sheets u the height detection sensor 582 every time the sheets are discharged to the stacking tray 507. With this operation, it is possible to prevent the sheet discharge port from being blocked with the sheet discharged to the stacking tray 507, and thus sheet discharge can be properly executed. Further, because the uppermost surface of the sheets can be placed in the vicinity of the sheet discharge port by lifting or lowering the stacking tray 507, there is an advantage that the sheets discharged from the sheet discharge port can be stacked in a stable manner. Further, in the present exemplary embodiment, the stacking tray 507 is lowered every time one sheet is discharged thereto. However, the stacking tray 507 may be lowered every time a predetermined number of sheets which is two or more are discharged in a bundle unit. For example, the stacking tray 507 may be lowered every time 10 sheets are discharged thereto.

Figure 13:
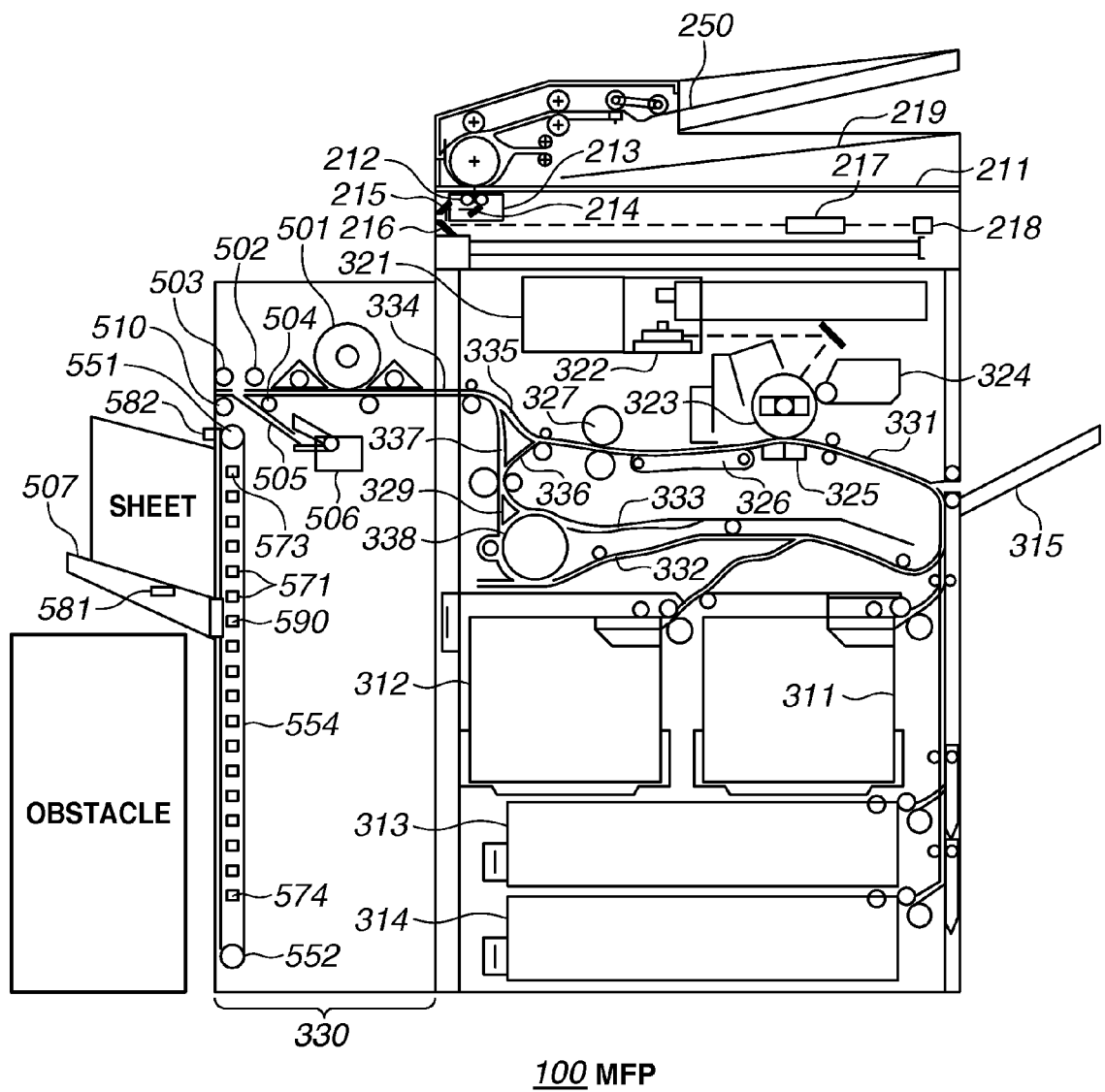
FIG. 13 is a cross-sectional diagram illustrating a configuration of the image processing apparatus according to the present exemplary embodiment.

As illustrated in FIG. 13, in a case where the obstacle which interrupts the lowering of the stacking tray 507 is placed under the stacking tray 507 capable of being lifted and lowered, the stacking tray 507 collides with the obstacle and cannot be lowered any further. If the stacking tray 507 is forced to be lowered thereafter, a load is applied to the stacking tray 507 and the lifting-lowering motor 561, and thus the stacking tray 507 or the lifting-lowering motor 561 may be damaged.

Therefore, in a case where the tray detection sensor 571 detects that the position of the stacking tray 507 is unchanged even though the CPU 120 has driven the lifting-lowering motor 561, the CPU 120 determines that the obstacle is placed under the stacking tray 507 and stops the printing and the lowering of the stacking tray 507.

With this operation, the stacking tray 507 is prevented from being lowered in a case where the obstacle is placed thereunder, and thus it is possible to prevent the stacking tray 507 and the lifting-lowering motor 561 from being damaged.

Further, in the present exemplary embodiment, even if an obstacle detection error has occurred in the stacking tray 507, the CPU 120 starts lifting the stacking tray 507 when the CPU 120 detects that the sheets stacked on the stacking tray 507 has been removed. Then, the CPU 120 restarts printing, discharges the sheets to the stacking tray 507, and gradually lowers the stacking tray 507. With this operation, lowering of the productivity can be suppressed.

In the above-described MFP 100, a space under the stacking tray 507 is easily accessible by the user because the space is close to the MFP 100. Therefore, the user may place bundles of sheets under the stacking tray 507 so that the user can promptly supply a bundle of sheets when there is a shortage of sheets in the MFP 100. Further, the user may place toner bottles under the stacking tray 507 so that the user can promptly supply toner when there is a shortage of toner in the MFP 100. Furthermore, the user may place an instruction manual under the stacking tray 507 so that the user can refer thereto when there is difficulty in operating the MFP 100.

As described above, if the user intentionally places the obstacle, there may be a case where the user does not have to remove the obstacle.

For example, in a case where the user stacks a small number of sheets, the user can complete sheet stacking without removing the obstacle.

On the other hand, if the user stacks a large number of sheets, it is better for the user to stack sheets after removing the obstacle. By removing the obstacle, the user can reduce a possibility of suspending the sheet stacking.

Therefore, the present exemplary embodiment enables the user to easily recognize how many sheets can be stacked after removing or without removing the obstacle.

Therefore, the user can easily determine whether the user should stack sheets after removing or stack the sheets without removing the obstacle.

Specifically, the MFP 100 according to the present exemplary embodiment lowers the stacking tray 507 without stacking sheets in a case where the user gives an instruction for detecting the number of stackable sheets. The user gives an instruction for detecting the number of stackable sheets by pressing a test key 607 of the operation unit 170. The above instruction may be given through an operation unit of the PC 111.

The MFP 100 detects a position of the stacking tray 507 in a case where the lowering of the stacking tray 507 is interrupted by the obstacle, and identifies the number of sheets stackable without removing the obstacle based on the detected position. Further, the MFP 100 identifies the number of sheets stackable after removing the obstacle (i.e., the maximum number of stackable sheets) by referring to the ROM 160. Then, the MFP 100 notifies the user of the number of sheets stackable without removing the obstacle and the number of sheets stackable after removing the obstacle (i.e., the maximum number of stackable sheets) through the operation unit 170.

Through the above control, the user can easily determine whether the user should stack sheets after removing or stack sheets without removing the obstacle by checking the respective numbers of stackable sheets.

Figure 4:
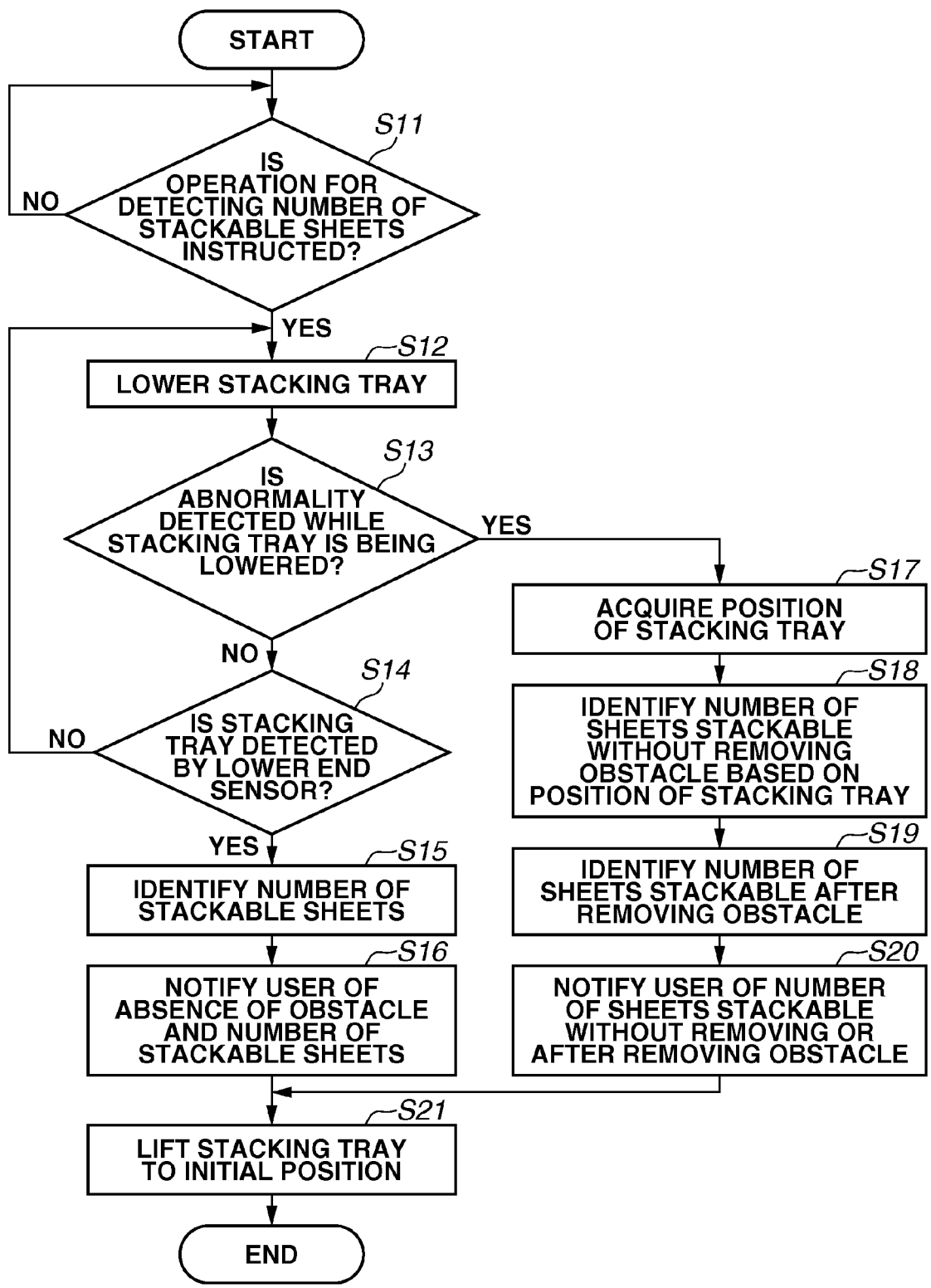
FIG. 4 is a flowchart illustrating an example of control processing according to the present exemplary embodiment.

Next, an operation for detecting the number of stackable sheets to be executed by the CPU 120 according to the present exemplary embodiment will be described with reference to the flowchart illustrated in FIG. 4. The processing illustrated in the flowchart of FIG. 4 is executed when the CPU 120 executes a program stored in the ROM 160 by loading the program onto the RAM 150.

In step S11, the CPU 120 determines whether the user gives an instruction for detecting the number of stackable sheets. Specifically, the CPU 120 determines whether the user gives an instruction for detecting the number of stackable sheets through the operation unit 170. In a case where the CPU 120 determines that the user has not given the instruction for detecting the number of stackable sheets (NO in step S11), the CPU 120 executes the processing in step S11 repeatedly. In a case where the CPU 120 determines that the user has given the instruction for detecting the number of stackable sheets (YES in step S11), the processing proceeds to step S12.

In step S12, the CPU 120 instructs the motor drive control unit 562 of the sheet discharge unit 330 to drive the lifting-lowering motor 561, so as to lower the stacking tray 507. At this time, the MFP 100 does not execute printing an image on a sheet or discharging the sheet.

In step S13, the CPU 120 determines whether any abnormality is detected while the stacking tray 507 is being lowered. For example, the CPU 120 detects the abnormality in a case where the lowering of the stacking tray 507 is interrupted by an obstacle placed under the stacking tray 507. Specifically, the CPU 120 detects that the position of the stacking tray 507 detected by the tray detection sensor 571 is unchanged even though the CPU 120 has driven the lifting-lowering motor 561 in the direction for lowering the stacking tray 507 by the belt 554. In such a case, the CPU 120 determines that the abnormality is detected while the stacking tray 507 is being lowered. In a case where the CPU 120 determines that the abnormality is detected (YES in step S13), the processing proceeds to step S17. In a case where the CPU 120 determines that the abnormality is not detected (NO in step S13), the processing proceeds to step S14.

In step S14, the CPU 120 determines whether the position of the stacking tray 507 is detected by the lower end sensor 574. In a case where the position of the stacking tray 507 is not detected by the lower end sensor 574 (NO in step S14), the processing proceeds to step S12. In a case where the position of the stacking tray 507 is detected by the lower end sensor 574 (YES in step S14), the processing proceeds to step S15.

In step S15, the CPU 120 identifies the number of sheets stackable on the stacking tray 507. In step S15, the CPU 120 recognizes that the number of sheets stackable on the stacking tray 507 is 3000 sheets by referring to the ROM 160 because the obstacle has not been detected. Thus, the maximum number of stackable sheets (i.e., 3000 sheets) is identified as the number of stackable sheets.

In step S16, the CPU 120 displays a screen indicating the absence of the obstacle and that the number of the stackable sheets is 3000 on the operation unit 170. FIG. 15 is a diagram illustrating an example of the screen displayed in step S16. A close key 1501 displayed on the screen in FIG. 15 is used for stopping the displaying of the screen in FIG. 15 to return to an initial screen.

On the other hand, when the processing proceeds to step S17 from step S13, in step S17, the CPU 120 acquires the position of the stacking tray 507. Specifically, among the 20 pieces of tray detection sensors 571, the CPU 120 identifies one tray detection sensor 571 that detects the stacking tray 507.

In step S18, based on the position of the stacking tray 507, the CPU 120 identifies the number of sheets stackable without removing the obstacle. Here, at first, the CPU 120 recognizes what position of the tray detection sensor 571 from the top is identified in step S17. After the CPU 120 has determined that the identified tray detection sensor 571 is the n-th tray detection sensor 571 from the top, the CPU 120 divides the maximum number of stackable sheets (3000 sheets) stored in the ROM 160 by the total number of the tray detection sensors 571 (20 pieces) to acquire a quotient, and multiplies the quotient by "n" to identify the number of stackable sheets.

In step S19, the CPU 120 identifies the number of sheets stackable after removing the obstacle. Herein, the CPU 120 recognizes that the number of sheets stackable on the stacking tray 507 is 3000 sheets by referring to the ROM 160. Herein, the maximum number of stackable sheets (i.e., 3000 sheets) is identified as the number of stackable sheets.

In step S20, the CPU 120 displays the number of sheets identified in step S18 and the number of sheets identified in step S19 on the operation unit 170. FIG. 14 is a diagram illustrating an example of the screen displayed in step S20. FIG. 14 illustrates an example of the screen displayed at a time when the stacking tray 507 is detected by the twelfth tray detection sensor 571 from the top. The screen displays a state where the CPU 120 identifies the number of sheets stackable without removing the obstacle as 1800 sheets through the processing in step S18 in which the CPU 120 divides 3000 sheets by 20 to acquire a quotient and multiplies the quotient by 12 to acquire a product. In FIG. 14, "3000 sheets" is displayed as the number of sheets stackable after removing the obstacle, whereas "1800 sheets" is displayed as the number of sheets stackable without removing the obstacle.

Then, in step S21, the CPU 120 instructs the motor drive control unit 562 of the sheet discharge unit 330 to drive the lifting-lowering motor 561 to lift the stacking tray 507 until the stacking tray 507 is detected by the upper end sensor 573 and ends the processing.

In the present exemplary embodiment, the maximum number of stackable sheets stored in the ROM 160 (i.e., 3000 sheets) has been divided by the number of tray detection sensors 571 (i.e., 20 pieces) every time the processing in step S18 is executed. However, the present invention is not limited thereto. Because the number of tray detection sensors 571 disposed on the sheet discharge unit 330 is fixed, the number of sheets corresponding to a space between the adjacent tray detection sensors 571 (i.e., 150 sheets) may be stored in the ROM 160. Then, in step S18, the CPU 120 may identify a product of 150 sheets and "n" as the number of sheets stackable without removing the obstacle.

Furthermore, in the present exemplary embodiment, the CPU 120 detects the number of stackable sheets according to an instruction from the user. However, the condition for detecting the number of stackable sheets is not limited to the above. For example, even if the user does not instruct the CPU 120 to detect the number of stackable sheets, the processing may proceed to step S12 from step S11, so that the CPU 120 detects the number of stackable sheets when the power is supplied to the MFP 100 and the activation of the MFP 100 has been completed.

By executing the above-described detecting of the number of stackable sheets, the user can easily recognize the number of sheets stackable after removing the obstacle, and the number of sheets stackable without removing the obstacle. Therefore, the user can easily determine whether the user should stack sheets after removing or stack sheets without removing the obstacle.

Then, after determining whether to remove the obstacle, the user executes a copy job or a print job to stack sheets.

Next, sheet stacking control to be executed by the CPU 120 according to the present exemplary embodiment will be described with reference to the flowcharts in FIGS. 5 to 8. The processing illustrated in the flowcharts of FIGS. 5 to 8 is executed when the CPU 120 executes a program stored in the ROM 160 by loading the program onto the RAM 150.

First, in step S1010, the CPU 120 determines whether a job for printing is stored in the non-volatile memory 140. In a case where the CPU 120 determines that the job is stored therein (YES in step S1010), the processing proceeds to step S1020. In a case where the CPU 120 determines that the job is not stored therein (NO in step S1010), the CPU 120 executes the processing in step S1010 repeatedly. The above-described copy job, printing job, or facsimile printing job is an example of the job for the printing.

In step S1020, the CPU 120 feeds a sheet from any one of the cassettes 311 to 314 or the manual feeding tray 315. Then, the CPU 120 controls the marking unit 320 to print an image on a fed sheet based on the image data of the job and the print settings.

In step S1030, the CPU 120 causes the sheet discharge unit 330 to discharge the sheet to the stacking tray 507.

In step S1040, the CPU 120 detects the upper surface of the sheets stacked on the stacking tray 507 by the height detection sensor 582. Then, the CPU 120 instructs the motor drive control unit 562 of the sheet discharge unit 330 to drive the lifting-lowering motor 561, so as to lower the stacking tray 507 such that the distance between the height detection sensor 582 and the upper surface of the sheets stacked on the stacking tray 507 becomes constant.

In step S1050, the CPU 120 acquires the position (height) of the stacking tray 507 based on the signal transmitted from the tray detection sensor 571.

In step S1060, the CPU 120 determines whether the position of the stacking tray 507 is detected by the lower end sensor 574. In a case where the CPU 120 determines that the position of the stacking tray 507 is detected by the lower end sensor 574 (YES in step S1060), the processing proceeds to step S1120 because the stacking tray 507 is fully loaded.

Figure 6:
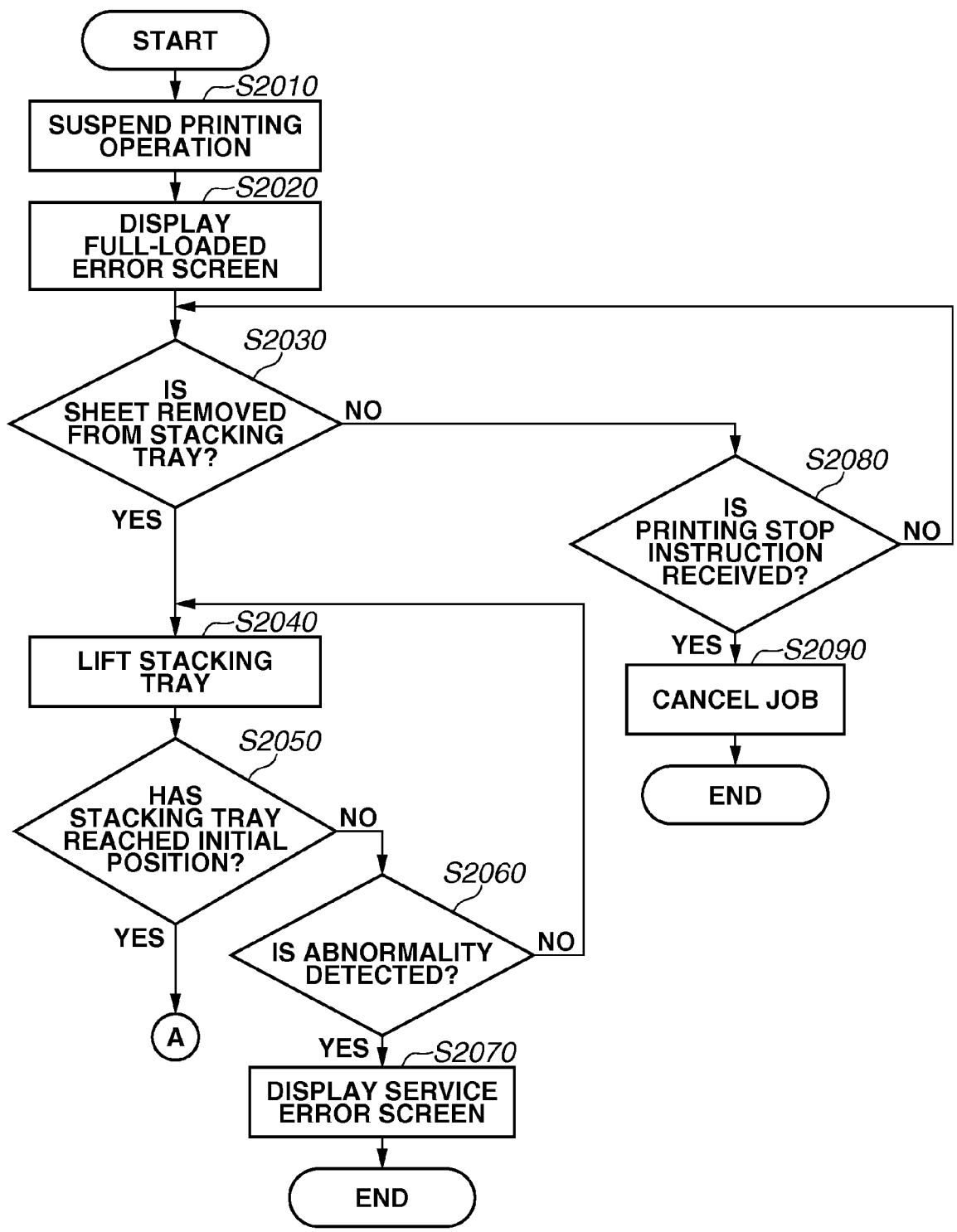
FIG. 6 is a flowchart illustrating an example of control processing according to the present exemplary embodiment.

The processing to be executed in step S1120 will be described with reference to FIG. 6.

In step S2010, the CPU 120 instructs the marking unit 320 to suspend the printing. At this time, the CPU 120 controls and suspends the sheet feeding. Further, the CPU 120 controls the sheets left on the sheet conveyance path of the MFP 100 to be discharged to the stacking tray 507. At this time, among the sheets left on the sheet conveyance path, a sheet on which an image has already been printed is discharged as it is, whereas a sheet on which an image is not printed yet is discharged after an image is printed thereon.

In step S2020, the CPU 120 displays a full-loaded error screen on the operation unit 170. FIG. 9 is a diagram illustrating an example of the full-loaded error screen displayed thereon. In FIG. 9, a message indicating that the full-loaded error has occurred in the stacking tray 507 is displayed. Further, a message prompting the user to remove the sheets stacked on the stacking tray 507 is displayed. Furthermore, a message indicating that the user can continue printing by removing the sheet, and a message prompting the user to press a stop key to stop printing are also displayed thereon. A stop key 801 allows the user to stop the job in which the printing is suspended.

In step S2030, the CPU 120 determines whether the sheets are removed from the stacking tray 507. In a case where the sheet presence-absence detection sensor 581 detects the sheets stacked on the stacking tray 507, the CPU 120 determines that the sheets are not removed from the stacking tray 507 (NO in step S2030), and the processing proceeds to step S2080. On the other hand, in a case where the sheet presence-absence detection sensor 581 does not detect the sheets stacked on the stacking tray 507, the CPU 120 determines that the sheets are removed from the stacking tray 507 (YES in step S2030), and the processing proceeds to step S2040.

In step S2080, the CPU 120 determines whether the user presses the stop key 801 to input an instruction for stopping the printing. In a case where the stop key 801 is pressed (YES in step S2080), the CPU 120 determines that an instruction for stopping the printing is received from the user, and the processing proceeds to step S2090. In a case where the CPU 120 determines that the stop key 801 is not pressed (NO in step S2080), the processing returns to step S2030.

In step S2090, the CPU 120 cancels the job in which the printing is suspended, deletes the information of the job from the non-volatile memory 140, and ends the processing. In the present exemplary embodiment, an example of the full-loaded error screen having the stop key 801 has been described. However, the stop key 801 does not have to be displayed thereon. In such a case, the CPU 120 repeatedly executes the processing in step S2030 until the CPU 120 determines that the sheets are removed from the stacking tray 507 in step S2030.

In a case where the processing proceeds to step S2040 from step S2030, in step S2040, the CPU 120 instructs the motor drive control unit 562 to drive the lifting-lowering motor 561, so as to lift the stacking tray 507.

In step S2050, the CPU 120 determines whether the stacking tray 507 has reached the initial position. In a case where the CPU 120 determines that the stacking tray 507 has not reached the initial position (NO in step S2050), the processing proceeds to step S2060. In a case where the CPU 120 determines that the stacking tray 507 has reached the initial position (YES in step S2050), the processing proceeds to step S1100 in FIG. 5. The initial position is a position where the stacking tray 507 exists in order to stack the sheets to be discharged thereto when no sheets are stacked on the stacking tray 507. When the stacking tray 507 is detected by the upper end sensor 573 in FIG. 2, the CPU 120 determines that the stacking tray 507 has reached the initial position.

In step S2060, the CPU 120 determines whether abnormality is detected while the stacking tray 507 is being lifted. In a case where the CPU 120 determines that the abnormality is detected (YES in step S2060), the processing proceeds to step S2070. In a case where the CPU 120 determines that the abnormality is not detected (NO in step S2060), the processing proceeds to step S2040. For example, the abnormality of the stacking tray 507 is detected in a case where the belt 554 is detached from the upper pulley 551 or the lower pulley 552 while the stacking tray 507 is being lifted. Further, the abnormality of the stacking tray 507 is also detected in a case where the driving force of the lifting-lowering motor 561 is not transmitted to the upper pulley 551. Specifically, the CPU 120 detects that the position of the stacking tray 507 detected by the tray detection sensor 571 is unchanged without being lifted even though the CPU 120 has driven the lifting-lowering motor 561 in the direction for lifting the stacking tray 507. In such a case, the CPU 120 determines that the abnormality is detected while the stacking tray 507 is being lifted.

In step S2070, the CPU 120 displays a service error screen illustrated in FIG. 10 on the operation unit 170, and ends the processing. On the screen illustrated in FIG. 10, a message indicating that the service operation is necessary, and a message prompting the user to call a service engineer are displayed. Further, contact information for calling the service engineer is also displayed thereon. In addition, instead of displaying the message prompting the user to call a service engineer and the contact information thereof, a message prompting the user to call a manager and contact information of the manager may be displayed thereon.

As described above, in the present exemplary embodiment, in a case where the stacking tray 507 collides with the obstacle and cannot be lowered while the stacking tray 507 is being lowered, the message prompting the user to call a service engineer is not displayed. On the other hand, in a case where the stacking tray 507 collides with the obstacle and cannot be lifted while the stacking tray 507 is being lifted, the message prompting the user to call a service engineer is displayed.

The description will be given by returning to the flowchart in FIG. 5.

In step S1060, in a case where the CPU 120 determines that the stacking tray 507 is not detected by the lower end sensor 574 (NO in step S1060), the processing proceeds to step S1070.

In step S1070, the CPU 120 determines whether abnormality is detected while the stacking tray 507 is being lowered. In a case where the CPU 120 determines that the abnormality is detected (YES in step S1070), the processing proceeds to step S1110. In a case where the CPU 120 determines that the abnormality is not detected (NO in step S1070), the processing proceeds to step S1080. For example, the CPU 120 detects the abnormality in a case where the lowering of the stacking tray 507 is interrupted by the obstacle placed under the stacking tray 507. Specifically, the CPU 120 detects that the position of the stacking tray 507 detected by the tray detection sensor 571 is unchanged even though the CPU 120 has driven the lifting-lowering motor 561 in the direction for lowering the stacking tray 507 by the belt 554. In such a case, the CPU 120 determines that the abnormality is detected while the stacking tray 507 is being lowered.

In step S1110, the CPU 120 determines whether the stacking tray 507 is positioned in the initial position. In a case where the CPU 120 determines that the stacking tray 507 is not positioned in the initial position (NO in step S1110), the processing proceeds to step S1130. In a case where the CPU 120 determines that the stacking tray 507 is positioned in the initial position (YES in step S1110), the processing proceeds to step S1140.

When the processing proceeds to step S1130 from step S1110, as illustrated in FIG. 13, only the sheets which are less than the maximum number originally stackable on the stacking tray 507 have been stacked on the stacking tray 507 because the obstacle is placed under the stacking tray 507. In such a case, the user can select whether to continue printing by removing the obstacle placed under the stacking tray 507, or to continue printing by removing the sheets stacked on the stacking tray 507 instead of removing the obstacle. In order to enable the user to make the above selection, the CPU 120 executes the processing in step S1130.

Figure 7:
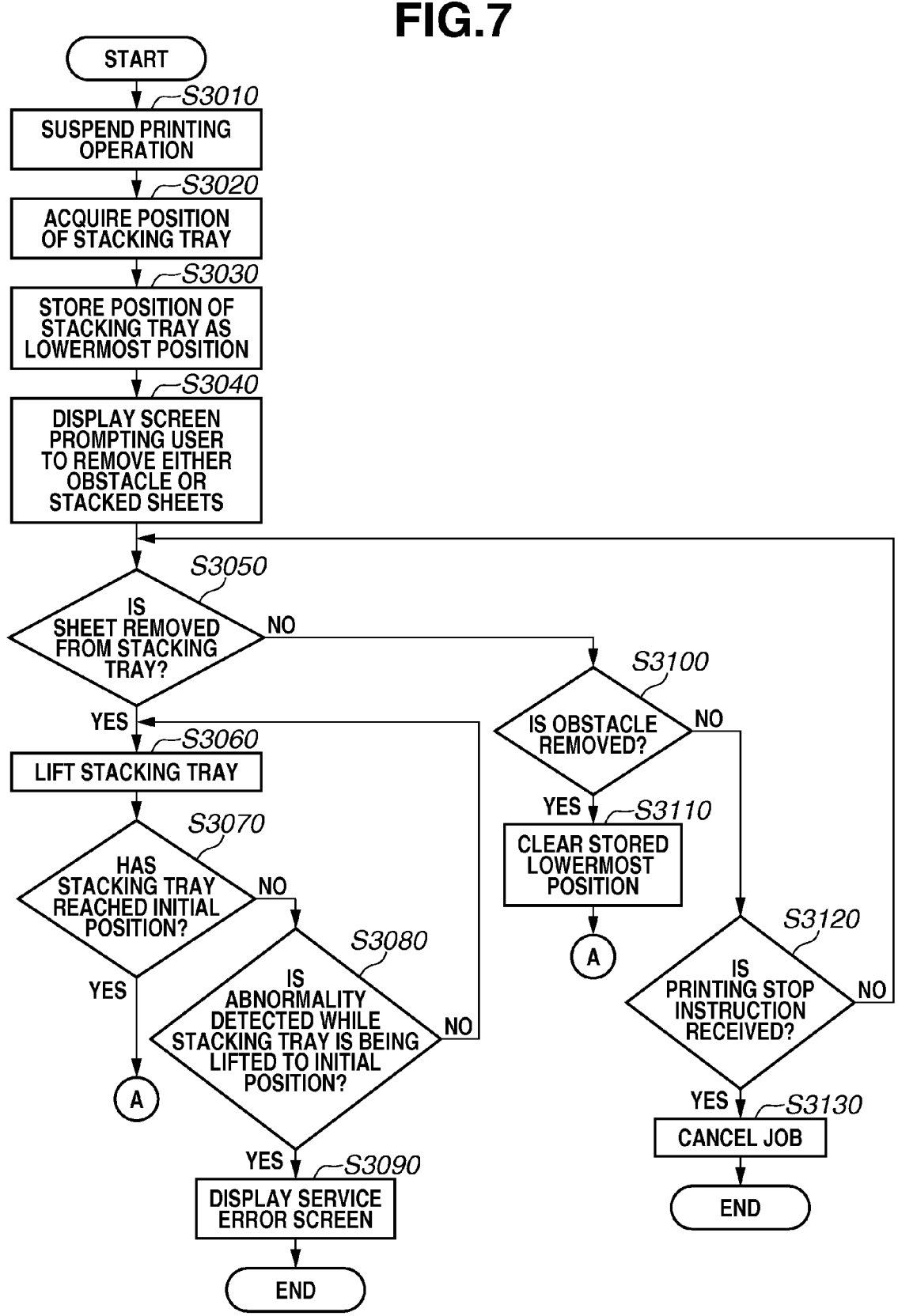
FIG. 7 is a flowchart illustrating an example of control processing according to the present exemplary embodiment.

The processing in step S1130 will be described in detail with reference to FIG. 7.

First, in step S3010, the CPU 120 instructs the marking unit 320 to suspend the printing. At this time, the CPU 120 controls and suspends the sheet feeding. Further, the CPU 120 controls the sheets left on the sheet conveyance path of the MFP 100 to be discharged to the stacking tray 507. At this time, among the sheets left on the sheet conveyance path, a sheet on which an image has already been printed is discharged as it is, whereas a sheet on which an image is not printed yet is discharged after an image is printed thereon.

In step S3020, the CPU 120 acquires a position of the stacking tray 507 based on a signal from the tray detection sensor 571.

In step S3030, the CPU 120 stores the acquired position of the stacking tray 507 in the non-volatile memory 140 as a lowermost position. Among the respective pieces of information for identifying a plurality of tray detection sensors 571, the information for identifying the tray detection sensor 571 which detects the stacking tray 507 at the time of processing in step S3030 is previously stored as the position of the stacking tray 507. In the example illustrated in FIG. 13, the information for identifying the tray detection sensor 590 is stored.

In step S3040, the CPU 120 displays the full-loaded error screen with a message prompting the user to remove the obstacle. FIG. 11 is a diagram illustrating an example of a screen displayed in step S3040. In FIG. 11, a message indicating that the obstacle detection error has occurred in the stacking tray 507 is displayed on the screen. Further, a message indicating that the user can continue printing by removing the sheet stacked on the stacking tray 507 or by removing the obstacle is displayed on the screen. A stop key 805 allows the user to stop the job in which the printing is suspended. An OK key 806 is pressed after the user has removed the obstacle. The CPU 120 determines that the obstacle is removed by recognizing that the OK key 806 is pressed.

In step S3050, the CPU 120 determines whether the sheets are removed from the stacking tray 507. When the sheet presence-absence detection sensor 581 detects the sheets stacked on the stacking tray 507, the CPU 120 determines that the sheets are not removed from the stacking tray 507 (NO in step S3050), and the processing proceeds to step S3100. On the other hand, when the sheet presence-absence detection sensor 581 does not detect the sheets stacked on the stacking tray 507, the CPU 120 determines that the sheets are removed from the stacking tray 507 (YES in step S3050), and the processing proceeds to step S3060.

In step S3100, the CPU 120 determines whether the obstacle is removed based on whether the OK key 806 is pressed. Specifically, the CPU 120 determines whether the user has pressed the OK key 806 illustrated in FIG. 11. In a case where the CPU 120 determines that the OK key 806 is pressed (YES in step S3100), the processing proceeds to step S3110. In a case where the CPU 120 determines that the OK key 806 is not pressed (NO in step S3100), the processing proceeds to step S3120.

Figure 5:
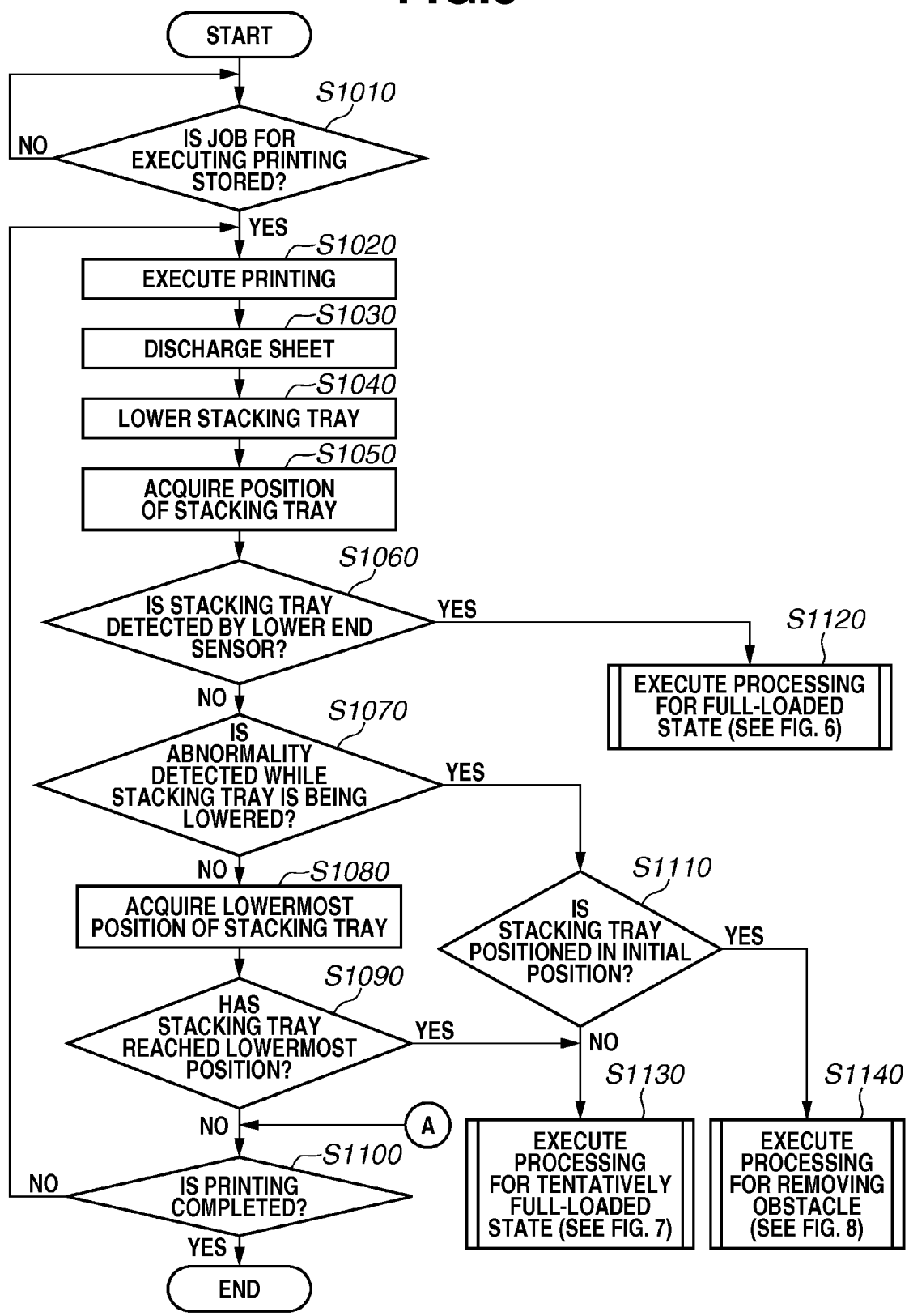
FIG. 5 is a flowchart illustrating an example of control processing according to the present exemplary embodiment.

In a case where the processing proceeds to step S3110, in step S3110, the CPU 120 clears the lowermost position stored in the non-volatile memory 140, and the processing proceeds to step S1100 in FIG. 5.

On the other hand, in a case where the processing proceeds to step S3120, in step S3120, the CPU 120 determines whether the user presses the stop key 805 to input an instruction for stopping the printing. In a case where the stop key 805 is pressed (YES in step S3120), the CPU 120 determines that an instruction for stopping the printing is received from the user, and the processing proceeds to step S3130. In a case where the CPU 120 determines that the stop key 805 is not pressed (NO in step S3120), the processing returns to step S3050.

In step S3130, the CPU 120 cancels the job in which the printing is suspended, deletes the information of the job from the non-volatile memory 140, and ends the processing.

In a case where the processing proceeds to step S3060 from step S3050, in step S3060, the CPU 120 instructs the motor drive control unit 562 to drive the lifting-lowering motor 561 to lift the stacking tray 507.

In step S3070, the CPU 120 determines whether the stacking tray 507 has reached the initial position. When the stacking tray 507 is detected by the upper end sensor 573, the CPU 120 determines that the stacking tray 507 has reached the initial position. In a case where the CPU 120 determines that the stacking tray 507 has not reached the initial position (NO in step S3070), the processing proceeds to step S3080. In a case where the CPU 120 determines that the stacking tray 507 has reached the initial position (YES in step S3070), the processing proceeds to step S1100 in FIG. 5.

In step S3080, the CPU 120 determines whether abnormality is detected while the stacking tray 507 is being lifted. In a case where the CPU 120 determines that the abnormality is detected (YES in step S3080), the processing proceeds to step S3090. In a case where the CPU 120 determines that the abnormality is not detected (NO in step S3080), the processing proceeds to step S3060. The abnormality detection method executed in step S3080 is the same as the abnormality detection method described in step S2060.

In step S3090, the CPU 120 displays the service error screen illustrated in FIG. 10 on the operation unit 170 and ends the processing. On the screen illustrated in FIG. 10, a message indicating that the service operation is necessary, and a message prompting the user to call a service engineer are displayed. Further, contact information for calling the service engineer is also displayed thereon.

Subsequently, the processing executed in step S1140 in FIG. 5 will be described with reference to FIG. 8.

Figure 8:
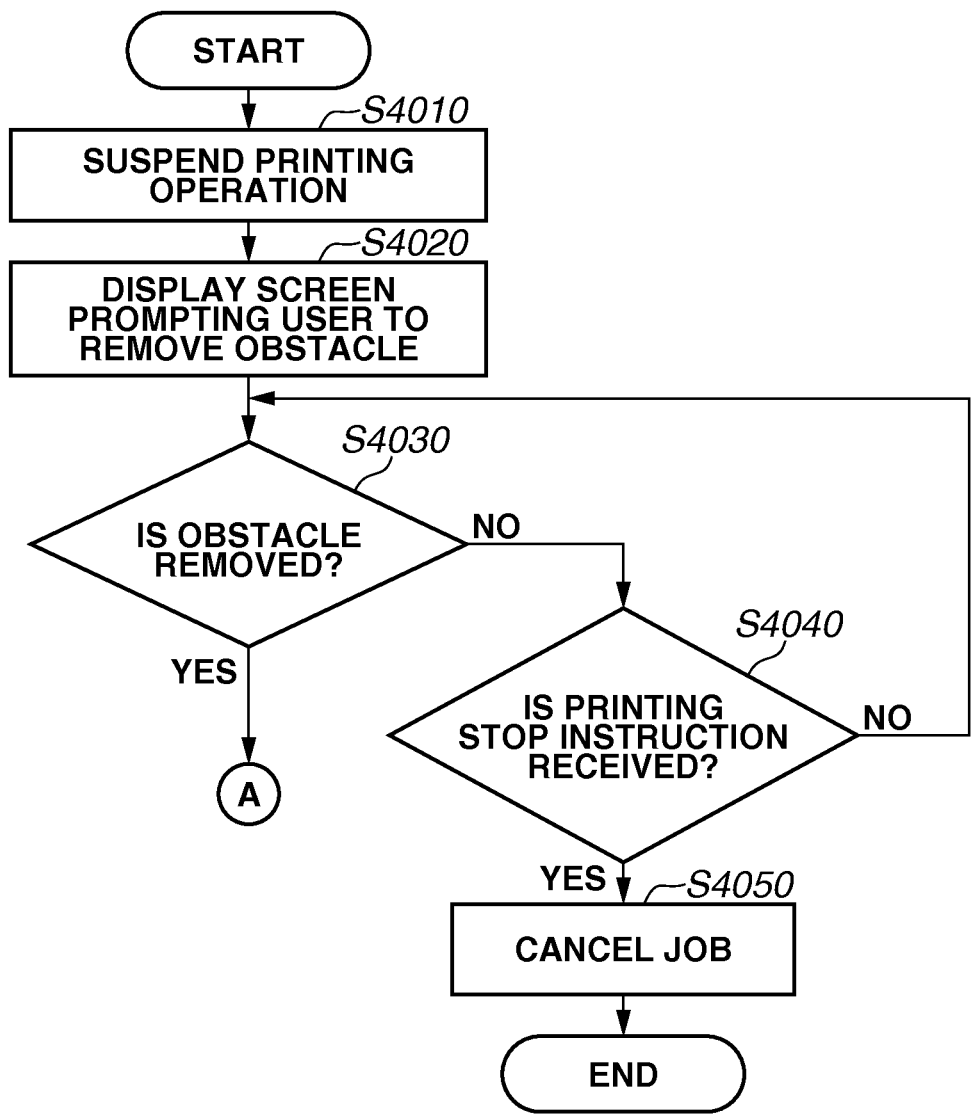
FIG. 8 is a flowchart illustrating an example of control processing according to the present exemplary embodiment.

The processing illustrated in FIG. 8 is executed when the CPU 120 determines that the abnormality is detected in the processing in FIG. 5 while the stacking tray 507 is being positioned in the initial position.

First, in step S4010, the CPU 120 instructs the marking unit 320 to suspend the printing.

In step S4020, the CPU 120 displays a screen prompting the user to remove the obstacle on the operation unit 170. An example of the displayed screen is illustrated in FIG. 12. In FIG. 12, a message indicating that the obstacle detection error has occurred in the stacking tray 507 is displayed on the screen. Further, a message indicating that the user can continue printing by removing the obstacle is displayed thereon. The user watches the screen and removes the obstacle placed under the stacking tray 507. A stop key 808 allows the user to stop the job in which the printing is suspended. An OK key 809 is pressed after the user has removed the obstacle. The CPU 120 determines that the obstacle is removed by detecting that the OK key 809 is pressed.

In step S4030, the CPU 120 determines whether the obstacle is removed based on whether the OK key 809 is pressed. Specifically, the CPU 120 determines whether the OK key 809 illustrated in FIG. 12 is pressed by the user. In a case where the CPU 120 determines that the OK key 809 is pressed (YES in step S4030), the processing proceeds to step S1100 in FIG. 5. In a case where the CPU 120 determines that the OK key 809 is not pressed (NO in step S4030), the processing proceeds to step S4040.

In step S4040, the CPU 120 cancels the job in which the printing is suspended, deletes the information of the job from the non-volatile memory 140, and ends the processing.

Hereinafter, the processing that is executed at a time when the processing proceeds to step S1080 from step S1070 in FIG. 5 will be described.

In a case where the processing proceeds to step S1080 from step S1070, in step S1080, the CPU 120 acquires the lowermost position stored in the non-volatile memory 140. This lowermost position has been stored in the non-volatile memory 140 by the CPU 120 in step S3030. Specifically, among the respective pieces of information for identifying a plurality of tray detection sensors 571, the information for identifying the tray detection sensor 571 which detects the stacking tray 507 at the time of processing in step S3030 is previously stored.

In step S1090, the CPU 120 determines whether the position of the stacking tray 507 conforms to the lowermost position which corresponds to the position of the tray detection sensor 571 identified by the acquired information. In a case where the CPU 120 determines that the position thereof conforms to the lowermost position (YES in step S1090), the processing proceeds to step S1130. On the other hand, in a case where the CPU 120 determines that the position thereof does not conform to the lowermost position (NO in step S1090), the processing proceeds to step S1100.

In a case where the processing proceeds to step S1130, the CPU 120 executes the processing that has been described with reference to FIG. 7.

On the other hand, in a case where the processing proceeds to step S1100 from step S1090, in step S1100, the CPU 120 determines whether the printing is completed. In a case where the CPU 120 determines that the printing is not completed (NO in step S1100), the processing returns to step S1020. In a case where the CPU 120 determines that the printing is completed (YES in step S1100), the CPU 120 ends the processing.

According to the present exemplary embodiment, the user can restart the printing by removing the sheets stacked on the stacking tray 507 when the lowering of the stacking tray 507 is interrupted by the obstacle. Further, after restarting the printing, the user can restart the sheet discharge while reducing a possibility of damaging the stacking tray 507 or the lifting-lowering motor 561 by the load applied thereto because the user can prevent the stacking tray 507 from colliding with the obstacle again.

Further, by executing the above-described operation for detecting the number of stackable sheets, the user can easily recognize the number of sheets stackable by removing the obstacle and the number of sheets stackable without removing the obstacle before the user executes the sheet stacking. Therefore, the user can easily determine whether the user should execute the sheet stacking after removing or without removing the obstacle.

Then, after the user has determined whether to remove the obstacle, the user can execute the sheet stacking by executing the copy job or the printing job.

Other Exemplary Embodiments

In the above-described exemplary embodiment, detecting of the number of stackable sheets illustrated in FIG. 4 has been executed when the sheet stacking is not executed. However, the present invention is not limited to the above. For example, the processing in step S17 and the subsequent steps may be executed when the CPU 120 detects abnormality of the stacking tray 507 while the sheet stacking is being executed according to the control illustrated in FIG. 5. Specifically, the CPU 120 may notify the user of the number of sheets stackable after removing the obstacle, and the number of sheets stackable without removing the obstacle.

In the above-described exemplary embodiment, a method for detecting the height of the stacking tray 507 by the tray detection sensor 571 has been described. However, the method for detecting the height of the stacking tray 507 is not limited to the above. For example, the CPU 120 may recognize the position of the stacking tray 507 based on how many convex portions has been counted from the initial position of the stacking tray 507 by a sensor which counts the convex portions of the concavo-convex belt 554 for lifting and lowering the stacking tray 507. For example, when the convex portions are arranged on the concavo-convex portion at the intervals of 5 mm, the CPU 120 recognizes that the stacking tray 507 is located at a position lowered by 250 mm from the initial position if fifty convex portions are counted regarding the initial position of the stacking tray 507 as a reference point. In a case where the above method is employed therefore, the CPU 120 stores as "X-mm" a position of the stacking tray 507 at which the obstacle is detected, so that the lowering of the stacking tray 507 is suspended at X-mm when the printing and stacking are restarted. In this case, in order to acquire the number of sheets stackable without removing the obstacle, "Z-mm" is stored in the ROM 160 as a length for the movement of the stacking tray 507 from the upper end sensor 573 to the lower end sensor 574. Thus, in step S18, the CPU 120 identifies the number of sheets stackable without removing the obstacle through the calculation: 3000 sheets×(X/Z).

Further, the CPU 120 may identify the rotation amount of the lifting-lowering motor 561 for lifting and lowering the stacking tray 507 regarding the initial position of the stacking tray 507 as a reference point, so as to recognize the position of the stacking tray 507 based on the identified rotation amount. For example, if the lifting-lowering motor 561 is a stepping motor, a moving amount of the stacking tray 507 from the initial position can be acquired by calculating a product of a moving amount of the stacking tray 507 per one step and the number of rotated steps (number of pulses). Then, the position of the stacking tray 507 can be recognized based on the acquired moving amount from the initial position. If the lifting-lowering motor 561 is a direct current (DC) motor, the position of the stacking tray 507 can be recognized based on the moving amount of the stacking tray 507 determined based on a rotation amount "P" of the DC motor. In this case, in order to acquire the number of sheets stackable without removing the obstacle, a rotation amount "Q" of the DC motor for moving the stacking tray 507 from the upper end sensor 573 to the lower end sensor 574 is stored in the ROM 160. Then, in step S18, the CPU 120 identifies the number of sheets stackable without removing the obstacle through the calculation: 3000 sheets×(P/Q).

Further, in the above-described exemplary embodiment, the number of sheets stackable without removing the obstacle, and the number of sheet stackable after removing the obstacle have been displayed in step S20. However, instead of notifying the user of the number of stackable sheets, the CPU 120 may notify the user of the height (thickness) of the stackable sheets. In this case, the maximum stackable height is stored in the ROM 160. The height of the sheets stackable after removing the obstacle can be identified by referring to the height stored in the ROM 160. On the other hand, the height of the sheets stackable without removing the obstacle can be acquired by dividing the maximum stackable height by the total number of the tray detection sensors 571 (i.e., 20 pieces) to acquire a quotient, and multiplying the quotient by the above-described "n" to acquire a product. According to the exemplary embodiment of the present invention, as long as the amount of sheets stackable without removing the obstacle and the amount of sheets stackable after removing the obstacle can be notified to the user, the amount of sheets can be either the number of the sheets or the height (thickness) of the sheets.

Further, the amount of sheets stackable without removing the obstacle can be acquired by a method described below. First, a table in which each tray detection sensor 571 is associated with the amount of stackable sheets is stored in the ROM 160. Then, in step S18, the CPU 120 may identify the amount of stackable sheets corresponding to the tray detection sensor 571 that detects the stacking tray 507 by referring to the table stored in the ROM 160.

Furthermore, in the above-described exemplary embodiment, the following method of detecting the abnormality caused by the obstacle in a lowering period of the stacking tray 507 has been described. In other words, the CPU 120 recognizes that the position of the stacking tray 507 detected by the tray detection sensor 571 is unchanged even though the CPU 120 has driven the lifting-lowering motor 561 in a direction for lowering the stacking tray 507 by the belt 554. Therefore, the CPU 120 determines that the abnormality has been caused by the obstacle while the stacking tray 507 is being lowered. However, the present invention is not limited to the above, and the interruption of the lowering of the stacking tray 507 caused by the obstacle may be detected by a sensor for detecting the obstacle placed under the stacking tray 507.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-258138 filed Dec. 13, 2013, which is hereby incorporated by reference herein in its entirety.

What is claimed is:

1. A sheet stacking apparatus comprising:
    a lowering control unit configured to lower a sheet stacking portion;
    a determination unit configured to determine that the sheet stacking portion cannot be lowered by the lowering control unit;
    an acquisition unit configured to acquire a position of the sheet stacking portion at which the determination unit determines that the sheet stacking portion cannot be lowered;
    an identification unit configured to identify an amount of sheets stackable on the sheet stacking portion without removing an obstacle placed under the sheet stacking portion based on the position acquired by the acquisition unit; and
    a notification unit configured to notify the amount of sheets identified by the identification unit and an amount of sheets stackable on the sheet stacking portion after removal of the obstacle placed under the sheet stacking portion.

2. The sheet stacking apparatus according to claim 1, further comprising
    a storage unit configured to store a maximum amount of sheets stackable on the sheet stacking portion,
    wherein the notification unit notifies the amount of sheets identified by the identification unit, and also notifies the maximum amount of sheets stored in the storage unit as an amount of sheets stackable on the sheet stacking portion after removal of the obstacle placed under the sheet stacking portion.

3. The sheet stacking apparatus according to claim 1, wherein the lowering control unit lowers the sheet stacking portion, the determination unit makes determination, the acquisition unit executes acquisition, the identification unit executes identification, and the notification unit executes notification in a state where sheet stacking is not executed on the sheet stacking portion.

4. The sheet stacking apparatus according to claim 1, wherein the lowering control unit lowers the sheet stacking portion, the determination unit makes determination, the acquisition unit executes acquisition, the identification unit executes identification, and the notification unit executes notification according to an instruction of a user.

5. The sheet stacking apparatus according to claim 1, wherein the lowering control unit lowers the sheet stacking portion, the determination unit makes determination, the acquisition unit executes acquisition, the identification unit executes identification, and the notification unit executes notification in response to activation of the sheet stacking apparatus.

6. The sheet stacking apparatus according to claim 1, further comprising
    a control unit configured to suspend sheet stacking with respect to the sheet stacking portion in a case where the determination unit determines that the sheet stacking portion cannot be lowered while the sheet stacking is being executed on the sheet stacking portion, and lift the sheet stacking portion to execute the sheet stacking on the uplifted sheet stacking portion in a case where the sheets stacked on the sheet stacking portion are removed while the sheet stacking with respect to the sheet stacking portion is being suspended.

7. The sheet stacking apparatus according to claim 6, wherein the control unit controls the sheet stacking with respect to the sheet stacking portion to be restarted in a case where the obstacle placed under the sheet stacking portion is removed while the sheet stacking with respect to the sheet stacking portion is being suspended, and wherein, the lowering control unit does not lift the sheet stacking portion but lowers the sheet stacking portion from a position where the sheet stacking is suspended.

8. The sheet stacking apparatus according to claim 6, wherein the control unit cancels a job for stacking the sheets in a case where the control unit receives an instruction for stopping the job for stacking the sheets while the sheet stacking with respect to the sheet stacking portion is being suspended.

9. The sheet stacking apparatus according to claim 6, wherein the control unit controls a display portion to display a screen prompting a user to call a service engineer in a case where the sheet stacking portion cannot be lifted while the sheet stacking portion is being lifted after removing the sheets stacked on the sheet stacking portion.

10. A printing apparatus comprising:
a printing unit configured to print an image on a sheet;
a lowering control unit configured to lower a sheet stacking portion for stacking a sheet on which an image is printed by the printing unit;
a determination unit configured to determine that the sheet stacking portion cannot be lowered by the lowering control unit;
an acquisition unit configured to acquire a position of the sheet stacking portion at which the determination unit determines that the sheet stacking portion cannot be lowered;
an identification unit configured to identify an amount of sheets stackable on the sheet stacking portion without removing an obstacle placed under the sheet stacking portion based on the position acquired by the acquisition unit; and
a notification unit configured to notify the amount of sheets identified by the identification unit and an amount of sheets stackable on the sheet stacking portion after removal of the obstacle placed under the sheet stacking portion.

11. The printing apparatus according to claim 10, further comprising
a reading unit configured to read an image on a document, wherein the printing unit prints an image read by the reading unit.

12. A control method for a sheet stacking apparatus having a lowering control unit configured to lower a sheet stacking portion, the control method comprising:
determining that the sheet stacking portion cannot be lowered by the lowering control unit;
acquiring a position of the sheet stacking portion at which determining determines that the sheet stacking portion cannot be lowered;
identifying an amount of sheets stackable on the sheet stacking portion without removing an obstacle placed under the sheet stacking portion based on the acquired position; and
notifying the identified amount of sheets and an amount of sheets stackable on the sheet stacking portion after removal of the obstacle placed under the sheet stacking portion.

13. A computer-readable storage medium storing a program to cause a sheet stacking apparatus to perform a control method, the control method comprising:
determining that the sheet stacking portion cannot be lowered by the lowering control unit;
acquiring a position of the sheet stacking portion at which determining determines that the sheet stacking portion cannot be lowered;
identifying an amount of sheets stackable on the sheet stacking portion without removing an obstacle placed under the sheet stacking portion based on the acquired position; and
notifying the identified amount of sheets and an amount of sheets stackable on the sheet stacking portion after removal of the obstacle placed under the sheet stacking portion.

14. A sheet stacking apparatus comprising:
a lowering control unit configured to lower a sheet stacking portion;
a determination unit configured to determine that the sheet stacking portion cannot be lowered by the lowering control unit;
an acquisition unit configured to acquire a position of the sheet stacking portion at which the determination unit determines that the sheet stacking portion cannot be lowered; and
a notification unit configured to notify an amount of sheets stackable on the sheet stacking portion without removal of an obstacle placed under the sheet stacking portion based on the position acquired by the acquisition unit.

* * * * *